US012596509B2

(12) United States Patent
Tamada et al.

(10) Patent No.: US 12,596,509 B2
(45) Date of Patent: Apr. 7, 2026

(54) IMAGE FORMING APPARATUS AND NON-TRANSITORY RECORDING MEDIUM STORING COMPUTER READABLE CONTROL PROGRAM

(71) Applicant: KONICA MINOLTA, INC., Tokyo (JP)

(72) Inventors: Takeshi Tamada, Toyohashi (JP); Takahiro Tsujimoto, Toyokawa (JP); Masahiro Kamiya, Toyohashi (JP)

(73) Assignee: KONICA MINOLTA, INC., Tokyo (JP)

( * ) Notice: Subject to any disclaimer, the term of this patent is extended or adjusted under 35 U.S.C. 154(b) by 39 days.

(21) Appl. No.: 18/496,380

(22) Filed: Oct. 27, 2023

(65) Prior Publication Data

US 2024/0192900 A1     Jun. 13, 2024

(30) Foreign Application Priority Data

Dec. 7, 2022    (JP) ................................. 2022-195408

(51) Int. Cl.
 G06F 3/12 (2006.01)
(52) U.S. Cl.
 CPC .......... G06F 3/1204 (2013.01); G06F 3/1207 (2013.01); G06F 3/121 (2013.01); G06F 3/1255 (2013.01); G06F 3/1259 (2013.01); G06F 3/1288 (2013.01)

(58) Field of Classification Search
 CPC ...... G06F 3/1204; G06F 3/1207; G06F 3/121; G06F 3/1255; G06F 3/1259; G06F 3/1288; G06F 3/12
 See application file for complete search history.

(56) References Cited

U.S. PATENT DOCUMENTS

2012/0327487 A1*  12/2012  Kamisuwa ........... H04N 1/2338
                                                                    358/527
2019/0114519 A1*   4/2019  Kimura ................. G01N 33/346
2023/0177670 A1*   6/2023  Sato ...................... G06T 7/0004
                                                                    382/112
2023/0319195 A1*  10/2023  Morimoto ............ H04N 1/2392
                                                                    358/1.12

FOREIGN PATENT DOCUMENTS

JP          2020154268 A       9/2020

* cited by examiner

*Primary Examiner* — John R Wallace
(74) *Attorney, Agent, or Firm* — BUCHANAN INGERSOLL & ROONEY PC

(57) ABSTRACT

An image forming apparatus includes a display section and a hardware processor that controls at least the display section, wherein the hardware processor causes the display section to display first information regarding a brand of the recording medium or a manufacturer of the recording medium, and second information regarding a usage amount or a usage rate of the recording medium associated with the first information.

10 Claims, 22 Drawing Sheets

SHEET USAGE RECORD DB

| MACHINE S/N | DATE | THIRD INFORMATION | FIRST INFORMATION | | SECOND INFORMATION | THIRD INFORMATION | | |
|---|---|---|---|---|---|---|---|---|
| | | INSTALLATION AREA | S/N | BRAND | NUMBER OF SHEETS USED | PRINT SETTING 1 (SINGLE-SIDED/ DOUBLE-SIDED) | PRINT SETTING 2 (MODE) | NUMBER OF JAMS THAT OCCURRED (JAM OCCURRENCE RATE) |
| ...... | ....... | ....... | ....... | ...... | ....... | ....... | ....... | ...... |
| M010001 | 2020/*/** | JAPAN | 1 | A PAPER | 1000 | SINGLE-SIDED | MONOCHROME/ CHARACTER | 0 |
| M010005 | 2020/*/** | JAPAN | 1 | A PAPER | 200 | SINGLE-SIDED | COLOR/ PHOTOGRAPH | 0 |
| ...... | ...... | ...... | ...... | ...... | ...... | ...... | ...... | ...... |
| ...... | ...... | ...... | ...... | ...... | ...... | ...... | ...... | ...... |
| M010005 | 2022/11/** | JAPAN | 2 | B PAPER | 150 | SINGLE-SIDED | MONOCHROME/ CHARACTER | 0 |

Figure 1:
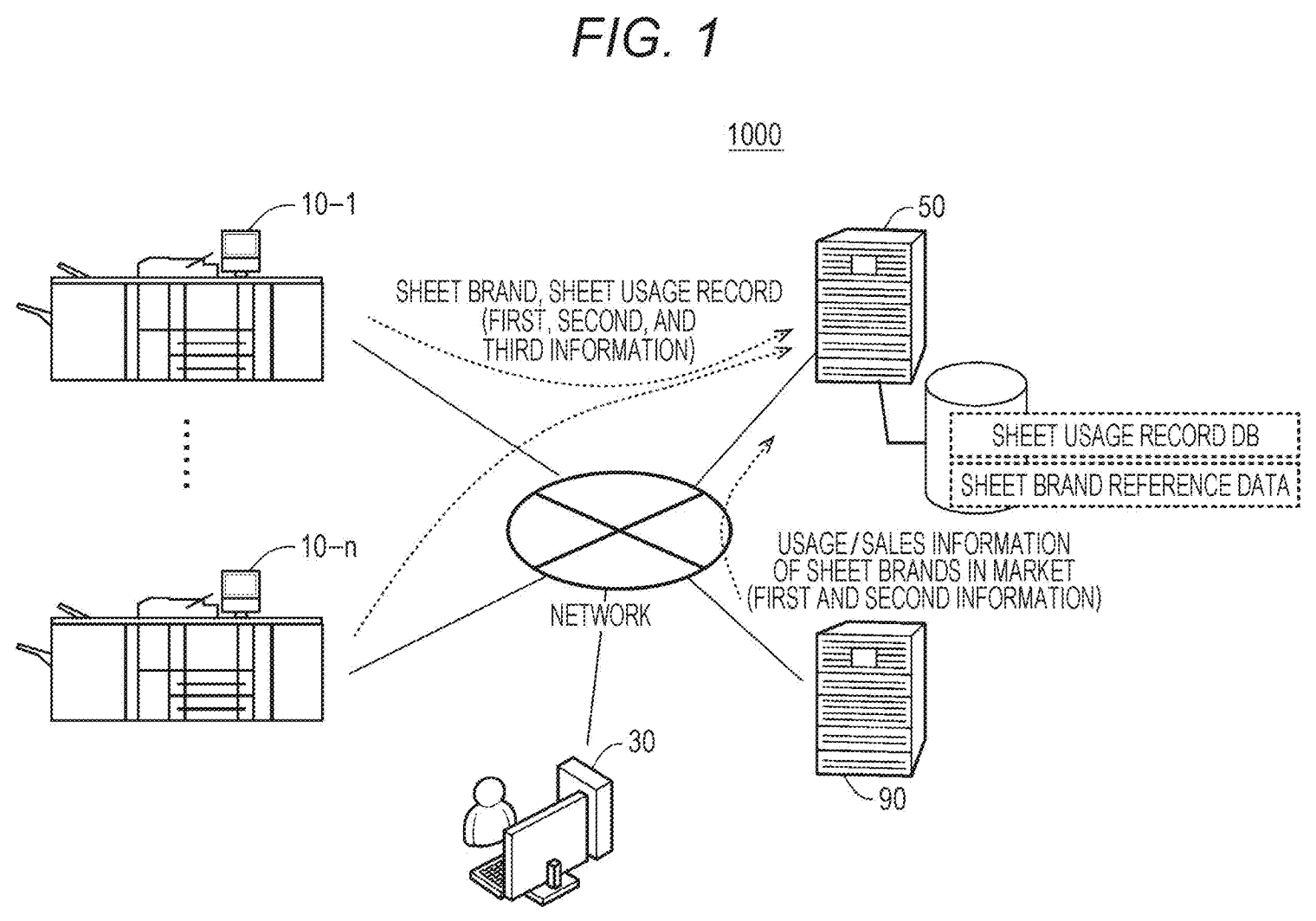

SHEET BRAND, SHEET USAGE RECORD
(FIRST, SECOND, AND
THIRD INFORMATION)

SHEET USAGE RECORD DB

SHEET BRAND REFERENCE DATA

50

10-1

10-n

90

USAGE/SALES INFORMATION
OF SHEET BRANDS IN MARKET
(FIRST AND SECOND INFORMATION)

NETWORK

CHARACTERISTIC DATA

| SHEET BRAND | A VALUE | B VALUE | C VALUE | SHEET TYPE | BASIS WEIGHT g/m² |
|---|---|---|---|---|---|
| UNIDENTIFIED | 0.330 | 0.236 | 3.480 | PLAIN SHEET | 78 |

FIG. 7B

SHEET BRAND REFERENCE DATA

| S/N | SHEET BRAND | SHEET CHARACTERISTIC INFORMATION (CHARACTERISTIC DATA) | | | | | |
| --- | --- | --- | --- | --- | --- | --- | --- |
| | | A VALUE | B VALUE | C VALUE | SHEET TYPE | BASIS WEIGHT g/m² | MANUFACTURER |
| 1 | A PAPER | 0.305 | 0.251 | 3.774 | PLAIN SHEET | 73 | ** COMPANY |
| 2 | B PAPER | 0.305 | 0.227 | 3.786 | PLAIN SHEET | 78 | ** COMPANY |
| 3 | C PAPER | 0.349 | 0.231 | 3.332 | RECYCLED SHEET | 61 | ** COMPANY |
| 4 | D PAPER | 0.151 | 0.024 | 3.505 | RECYCLED SHEET | 200 | ** COMPANY |
| 5 | E PAPER | 0.270 | 0.152 | 3.900 | COATED SHEET | 113 | ** COMPANY |
| : | : | : | : | : | : | : | : |
| 101 | A2 PAPER | ** | ** | ** | COATED SHEET | ** | ** |
| : | : | : | : | : | : | : | : |
| 250 | A9 PAPER | ** | ** | ** | THICK SHEET | ** | ** |
| : | : | : | : | : | : | : | : |

*FIG. 7C*

| S/N | SHEET BRAND | SHEET CHARACTERISTIC INFORMATION | | | | | SUITABILITY | BRAND PREDICTION RANKING |
| --- | --- | --- | --- | --- | --- | --- | --- | --- |
| | | A VALUE | B VALUE | C VALUE | SHEET TYPE | BASIS WEIGHT g/m² | | |
| 1 | A PAPER | 0.305 | 0.251 | 3.774 | PLAIN SHEET | 73 | 90.7 | 4 |
| 2 | B PAPER | 0.305 | 0.227 | 3.786 | PLAIN SHEET | 78 | 97.0 | 1 |
| 3 | C PAPER | 0.349 | 0.231 | 3.332 | RECYCLED SHEET | 61 | 86.9 | 19 |
| 4 | D PAPER | 0.151 | 0.024 | 3.505 | RECYCLED SHEET | 200 | 39.6 | 218 |
| 5 | E PAPER | 0.270 | 0.152 | 3.900 | COATED SHEET | 113 | 79.1 | 40 |
| ⋯ | ⋯ | ⋯ | ⋯ | ⋯ | ⋯ | ⋯ | ⋯ | ⋯ |
| ⋯ | ⋯ | | | | ⋯ | ⋯ | ⋯ | ⋯ |

FIG. 8A

SHEET USAGE RECORD DB

| MACHINE S/N | DATE | THIRD INFORMATION | FIRST INFORMATION | | SECOND INFORMATION | THIRD INFORMATION | | |
|---|---|---|---|---|---|---|---|---|
| | | INSTALLATION AREA | S/N | BRAND | NUMBER OF SHEETS USED | PRINT SETTING 1 (SINGLE-SIDED/DOUBLE-SIDED) | PRINT SETTING 2 (MODE) | NUMBER OF JAMS THAT OCCURRED (JAM OCCURRENCE RATE) |
| ⋯ | ⋯ | ⋯ | ⋯ | ⋯ | ⋯ | ⋯ | ⋯ | ⋯ |
| M010001 | 2020/*/** | JAPAN | 1 | A PAPER | 1000 | SINGLE-SIDED | MONOCHROME/CHARACTER | 0 |
| M010005 | 2020/*/** | JAPAN | 1 | A PAPER | 200 | SINGLE-SIDED | COLOR/PHOTOGRAPH | 0 |
| ⋯ | ⋯ | ⋯ | ⋯ | ⋯ | ⋯ | ⋯ | ⋯ | ⋯ |
| ⋯ | ⋯ | ⋯ | ⋯ | ⋯ | ⋯ | ⋯ | ⋯ | ⋯ |
| M010005 | 2022/11/** | JAPAN | 2 | B PAPER | 150 | SINGLE-SIDED | MONOCHROME/CHARACTER | 0 |

FIG. 8B

SHEET USAGE RECORD DB

| | | SECOND INFORMATION (USAGE RECORDS) | |
|---|---|---|---|
| S/N | SHEET BRAND | NUMBER OF SHEETS USED | SHEET USAGE RATE |
| 1 | A PAPER | 200000 | 0. 166667% |
| 2 | B PAPER | 10000 | 0. 008333% |
| 3 | C PAPER | 2030 | 0. 001692% |
| 4 | D PAPER | 10 | 0. 000008% |
| 5 | E PAPER | 50000 | 0. 041667% |
| ... | ... | ... | ... |
| 101 | A2 PAPER | **** | ****% |
| ... | ... | ... | ... |
| TOTAL | | 120000000 | 100% |

Figure 9:
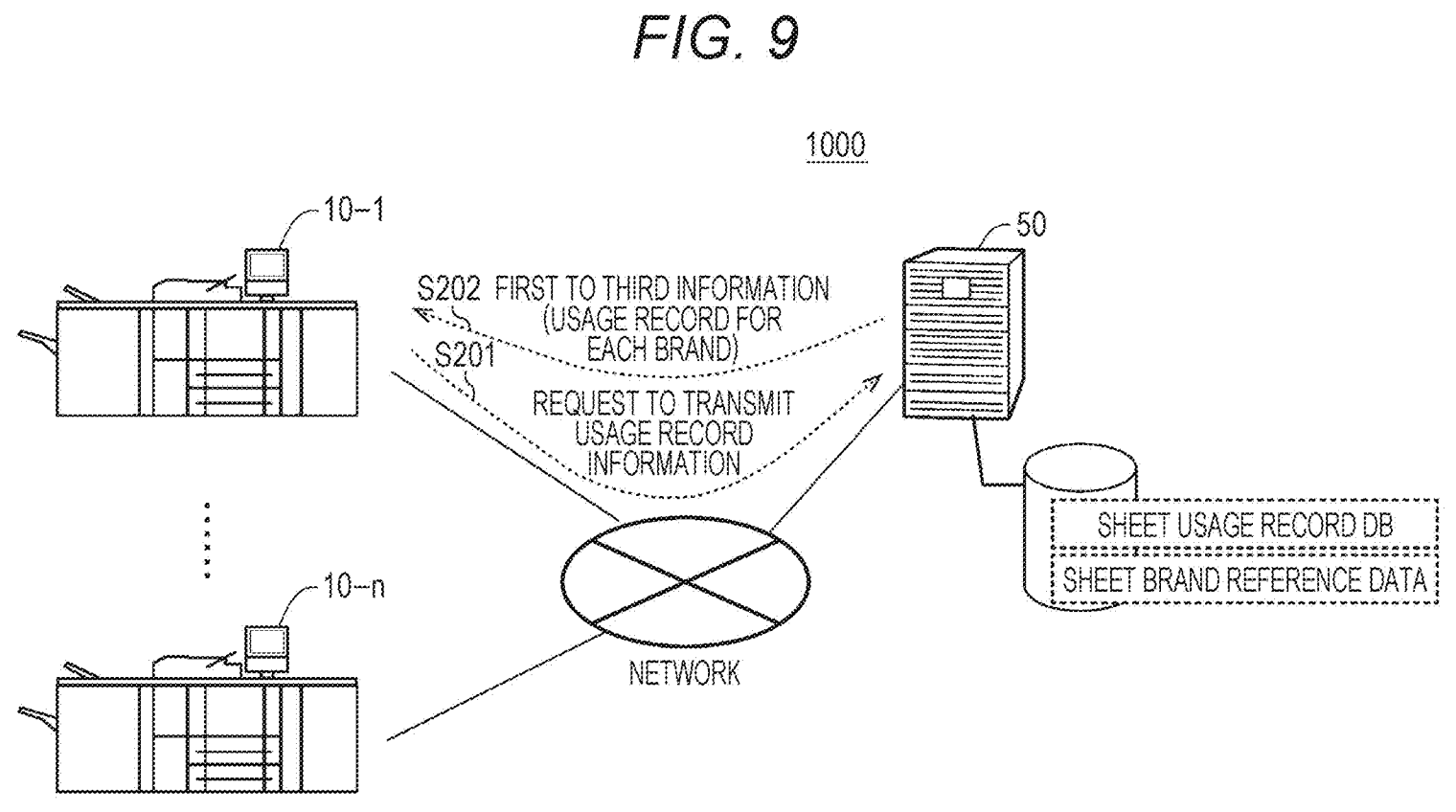

SHEET USAGE RECORD DB

SHEET BRAND REFERENCE DATA

50

S202 FIRST TO THIRD INFORMATION (USAGE RECORD FOR EACH BRAND)

S201 REQUEST TO TRANSMIT USAGE RECORD INFORMATION

NETWORK

| SHEET BRAND | SHEET TYPE | BASIS WEIGHT g/m² | NUMBER OF SHEETS USED | USAGE RATE | MANUFACTURER | RANKING IN MARKET |
|---|---|---|---|---|---|---|
| S PAPER | PLAIN SHEET | 64 | 800000 | 0.66667% | DEF COMPANY | 1 |
| ⋮ | ⋮ | ⋮ | ⋮ | ⋮ | ⋮ | ⋮ |
| A PAPER | PLAIN SHEET | 68 | 200000 | 0.17000% | ABC COMPANY | 41 |
| ⋮ | ⋮ | ⋮ | ⋮ | ⋮ | ⋮ | ⋮ |
| B PAPER | PLAIN SHEET | 80 | 10000 | 0.00833% | ABC COMPANY | 80 |
| ⋮ | ⋮ | ⋮ | ⋮ | ⋮ | ⋮ | ⋮ |
| W PAPER | PLAIN SHEET | 64 | 2000 | 0.00167% | GHI COMPANY | 150 |
| Z PAPER | PLAIN SHEET | 104 | 1500 | 0.00125% | GHI COMPANY | 151 |
| ⋮ | ⋮ | ⋮ | ⋮ | ⋮ | ⋮ | ⋮ |
| ⋮ | ⋮ | TOTAL | 120000000 | ⋮ | ⋮ | ⋮ |

FIG. 13

SECOND EMBODIMENT

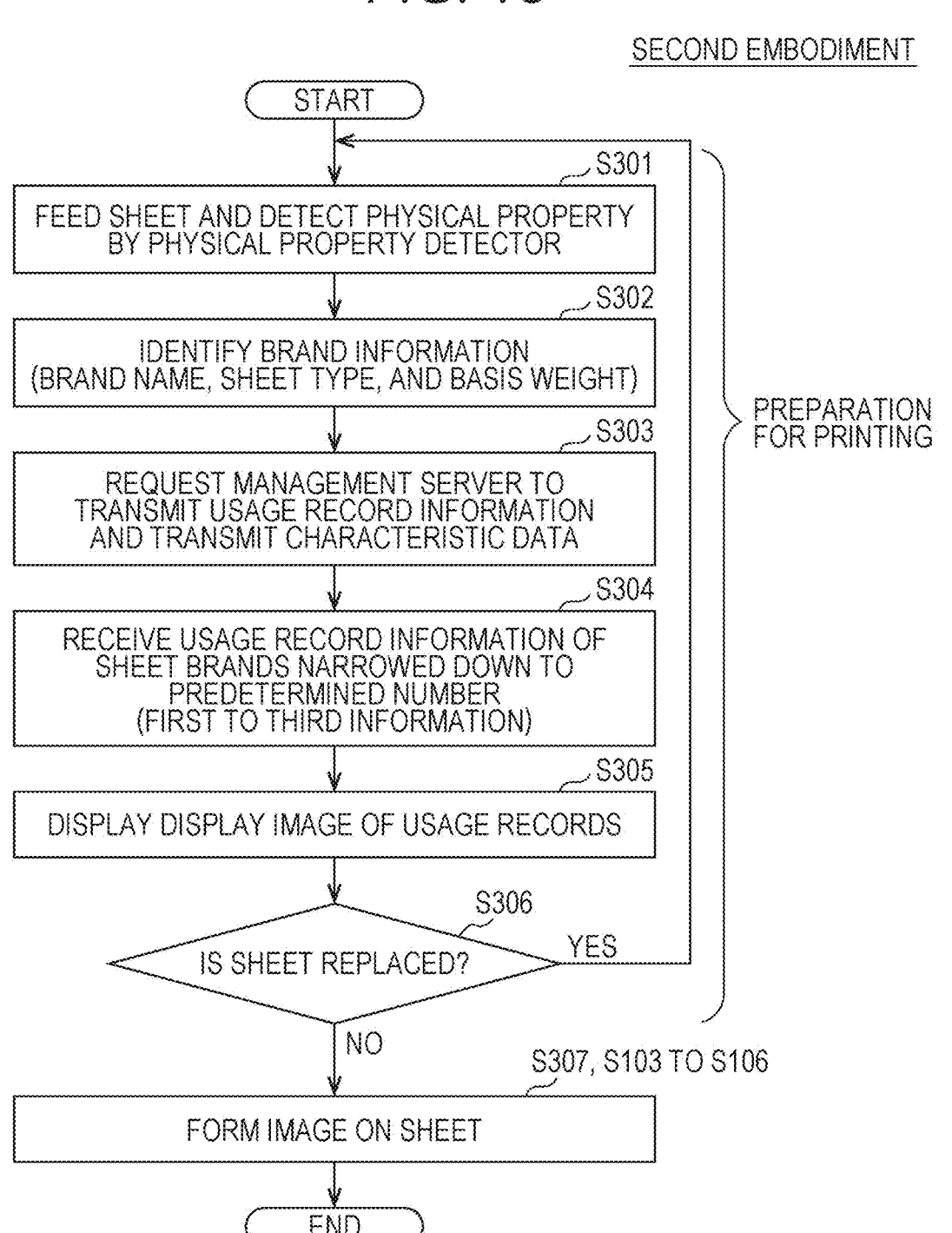

START

S301
FEED SHEET AND DETECT PHYSICAL PROPERTY
BY PHYSICAL PROPERTY DETECTOR

S302
IDENTIFY BRAND INFORMATION
(BRAND NAME, SHEET TYPE, AND BASIS WEIGHT)

S303
REQUEST MANAGEMENT SERVER TO
TRANSMIT USAGE RECORD INFORMATION
AND TRANSMIT CHARACTERISTIC DATA

S304
RECEIVE USAGE RECORD INFORMATION OF
SHEET BRANDS NARROWED DOWN TO
PREDETERMINED NUMBER
(FIRST TO THIRD INFORMATION)

S305
DISPLAY DISPLAY IMAGE OF USAGE RECORDS

S306
IS SHEET REPLACED?    YES

NO

PREPARATION
FOR PRINTING

S307, S103 TO S106
FORM IMAGE ON SHEET

END

*FIG. 14A*

| SHEET BRAND | SHEET TYPE | BASIS WEIGHT g/m² | NUMBER OF SHEETS USED | USAGE RATE | MANUFACTURER | BRAND PREDICTION RANKING |
|---|---|---|---|---|---|---|
| B PAPER | PLAIN SHEET | 80 | 10000 | 0.00833% | ABC COMPANY | 1 |
| S PAPER | PLAIN SHEET | 64 | 800000 | 0.66667% | DEF COMPANY | 2 |
| W PAPER | PLAIN SHEET | 64 | 2000 | 0.00167% | GHI COMPANY | 3 |
| A PAPER | PLAIN SHEET | 68 | 200000 | 0.17000% | ABC COMPANY | 4 |
| Z PAPER | PLAIN SHEET | 104 | 1500 | 0.00125% | GHI COMPANY | 5 |
| ⋮ | ⋮ | ⋮ | ⋮ | ⋮ | ⋮ | ⋮ |
| ⋮ | ⋮ | ⋮ | ⋮ | ⋮ | ⋮ | ⋮ |
| ⋮ | ⋮ | ⋮ | ⋮ | ⋮ | ⋮ | ⋮ |
| | TOTAL | | 120000000 | | | |

*FIG. 14B*

| SHEET BRAND | SHEET TYPE | BASIS WEIGHT g/m² | NUMBER OF SHEETS USED | USAGE RATE | MANUFACTURER |
|---|---|---|---|---|---|
| B PAPER | PLAIN SHEET | 80 | 10000 | 0.00833% | ABC COMPANY |
| S PAPER | PLAIN SHEET | 64 | 800000 | 0.66667% | DEF COMPANY |
| W PAPER | PLAIN SHEET | 64 | 2000 | 0.00167% | GHI COMPANY |
| A PAPER | PLAIN SHEET | 68 | 200000 | 0.17000% | ABC COMPANY |
| Z PAPER | PLAIN SHEET | 104 | 1500 | 0.00125% | GHI COMPANY |

*FIG. 14C*

| SHEET BRAND | SHEET TYPE | BASIS WEIGHT g/m² | NUMBER OF SHEETS USED | USAGE RATE | MANUFACTURER |
|---|---|---|---|---|---|
| S PAPER | PLAIN SHEET | 64 | 800000 | 0.66667% | DEF COMPANY |
| A PAPER | PLAIN SHEET | 68 | 200000 | 0.17000% | ABC COMPANY |
| B PAPER | PLAIN SHEET | 80 | 10000 | 0.00833% | ABC COMPANY |
| W PAPER | PLAIN SHEET | 64 | 2000 | 0.00167% | GHI COMPANY |
| Z PAPER | PLAIN SHEET | 104 | 1500 | 0.00125% | GHI COMPANY |

FIG. 15A

FILTER CONDITION: INSTALLATION AREA IS AICHI PREFECTURE

| SHEET BRAND | SHEET TYPE | BASIS WEIGHT g/m² | NUMBER OF SHEETS USED | USAGE RATE | MANUFACTURER | JAM OCCURRENCE RATE | INSTALLATION AREA |
|---|---|---|---|---|---|---|---|
| B PAPER | PLAIN SHEET | 80 | 6000 | 0.50000% | ABC COMPANY | 0.010000% | AICHI PREFECTURE |
| S PAPER | PLAIN SHEET | 64 | 4000 | 0.33333% | DEF COMPANY | 0.000625% | AICHI PREFECTURE |
| W PAPER | PLAIN SHEET | 64 | 30 | 0.00250% | GHI COMPANY | 0.000000% | AICHI PREFECTURE |
| A PAPER | PLAIN SHEET | 68 | 30000 | 2.50000% | ABC COMPANY | 0.020000% | AICHI PREFECTURE |
| Z PAPER | PLAIN SHEET | 104 | 400 | 0.03333% | GHI COMPANY | 0.500000% | AICHI PREFECTURE |
| | TOTAL | | 1200000 | | | | |

FIG. 15B

FILTER CONDITION: INSTALLATION OFFICE IS IN XYZ COMPANY

| SHEET BRAND | SHEET TYPE | BASIS WEIGHT g/m² | NUMBER OF SHEETS USED | USAGE RATE | MANUFACTURER | JAM OCCURRENCE RATE | INSTALLATION OFFICE |
|---|---|---|---|---|---|---|---|
| B PAPER | PLAIN SHEET | 80 | 4000 | 0.66667% | ABC COMPANY | 0.010000% | XYZ COMPANY |
| S PAPER | PLAIN SHEET | 64 | 10000 | 1.66667% | DEF COMPANY | 0.000625% | XYZ COMPANY |
| W PAPER | PLAIN SHEET | 64 | 10 | 0.00167% | GHI COMPANY | 0.000000% | XYZ COMPANY |
| A PAPER | PLAIN SHEET | 68 | 20000 | 3.33333% | ABC COMPANY | 0.020000% | XYZ COMPANY |
| Z PAPER | PLAIN SHEET | 104 | 30 | 0.00500% | GHI COMPANY | 0.500000% | XYZ COMPANY |
| | TOTAL | | 600000 | | | | |

FIG. 15C

FILTER CONDITION: PRINT SETTING IS MONOCHROME/CHARACTER

| SHEET BRAND | SHEET TYPE | BASIS WEIGHT g/m² | NUMBER OF SHEETS USED | USAGE RATE | MANUFACTURER | JAM OCCURRENCE RATE | PRINT SETTING 2 |
|---|---|---|---|---|---|---|---|
| B PAPER | PLAIN SHEET | 80 | 100 | 0. 00833% | ABC COMPANY | 0. 010000% | MONOCHROME/CHARACTER |
| S PAPER | PLAIN SHEET | 64 | 3000 | 0. 25000% | DEF COMPANY | 0. 000625% | MONOCHROME/CHARACTER |
| W PAPER | PLAIN SHEET | 64 | 50 | 0. 00417% | GHI COMPANY | 0. 000000% | MONOCHROME/CHARACTER |
| A PAPER | PLAIN SHEET | 68 | 10000 | 0. 83333% | ABC COMPANY | 0. 020000% | MONOCHROME/CHARACTER |
| Z PAPER | PLAIN SHEET | 104 | 10 | 0. 00083% | GHI COMPANY | 0. 500000% | MONOCHROME/CHARACTER |
| | TOTAL | | 1200000 | | | | |

IMAGE FORMING APPARATUS AND NON-TRANSITORY RECORDING MEDIUM STORING COMPUTER READABLE CONTROL PROGRAM

CROSS-REFERENCE TO RELATED APPLICATION

The entire disclosure of Japanese patent application No. 2022-195408, filed on Dec. 7, 2022, is incorporated herein by reference in its entirety.

BACKGROUND

1. Technological Field

The present invention relates to an image forming apparatus and a non-transitory recording medium storing a computer readable control program.

2. Description of the Related Art

An image forming apparatus such as an electrophotographic printer feeds and conveys sheets loaded in a sheet feed tray one by one, and forms an image on the sheets with toner in an image forming section. In order to appropriately form a high-quality image on a sheet, it is necessary to set image forming parameters in accordance with the characteristics of the sheet.

A technology for easily setting the image forming parameters is disclosed in Japanese Unexamined Patent Application Publication No. 2020-154268. According to Japanese Unexamined Patent Application Publication No. 2020-154268, sheet attributes such as sheet types and a plurality of image forming parameters associated with the sheet attributes are stored. When a sheet attribute to be used for printing is received, a recommendation degree for each image forming parameter determined based on evaluation of the occurrence of a jam, the fixation of a color material, and the like in past image formation is displayed. A user can easily set an appropriate image forming parameter by selecting the parameter from the above-described parameters.

SUMMARY

However, there are an enormous number of types of sheets (also referred to as recording media) in the market, and among these, there are sheets (poor-quality sheets) for which it is difficult to output a favorable image by adjusting the image forming parameters within an adjustment range. In a case where a poor-quality sheet is used, not only a decrease in image quality but also a conveyance failure such as a sheet jam tends to occur, and thus using such a poor-quality sheet in an unintended manner causes a disadvantage to a user. Furthermore, in some cases, it is not possible to immediately determine whether a trouble is caused by a poor-quality sheet or an abnormality on the image forming apparatus side, and it may take a lot of time and man-hours to solve the trouble.

The present invention has been made in view of the above circumstances, and an object of the present invention is to provide an image forming apparatus and a control program capable of easily recognizing a recording medium appropriate for image formation.

To achieve at least one of the abovementioned objects, according to an aspect of the present invention, a device reflecting one aspect of the present inventions comprises the followings.

An image forming apparatus that forms an image on a recording medium, the image forming apparatus including a display section, and a hardware processor that controls at least the display section, wherein the hardware processor causes the display section to display first information regarding a brand of the recording medium or a manufacturer of the recording medium, and second information regarding a usage amount or a usage rate of the recording medium associated with the first information.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 1 is a diagram illustrating a schematic configuration of an information processing system including an image forming apparatus according to the present embodiment;

FIG. 7A is a diagram illustrating an example of characteristic data obtained by detection by a physical property detector and used for identifying sheet brand information;

FIG. 7B is a diagram illustrating an example of sheet brand reference data;

FIG. 7C is a diagram illustrating an example of suitability calculated from the sheet brand reference data and the characteristic data illustrated in FIG. 7A;

FIG. 8A is a diagram illustrating an example of a sheet usage record database generated by aggregating results of using sheets by each machine;

FIG. 8B is a diagram illustrating an example in which a usage record for each sheet brand is extracted from the sheet usage record database illustrated in FIG. 8A;

FIG. 9 is a diagram illustrating the flow of data in the information processing system;

FIG. 11 is a diagram illustrating an example of a display image displayed on the operation display section;

FIG. 13 is a flowchart illustrating a display process in an image forming apparatus according to the second embodiment;

FIG. 14A is a diagram illustrating data of a usage record DB that is sorted in descending order of brand prediction rankings;

FIG. 14B is a diagram illustrating an example of a display image displayed on an operation display section;

FIG. 14C is a diagram illustrating an example of a display image in which records are arranged in descending order of usage amounts/usage rates;

FIG. 15A illustrates a diagram illustrating an example of a display image indicating usage amounts and the like based on usage record information that matches a filter condition;

FIG. 15B is a diagram illustrating another example of a display image indicating usage amounts and the like based on usage record information that matches a filter condition; and FIG. 15C is a diagram illustrating an example of a display image indicating usage amounts and the like based on usage record information that matches a filter condition.

DETAILED DESCRIPTION OF EMBODIMENTS

Figure 2:
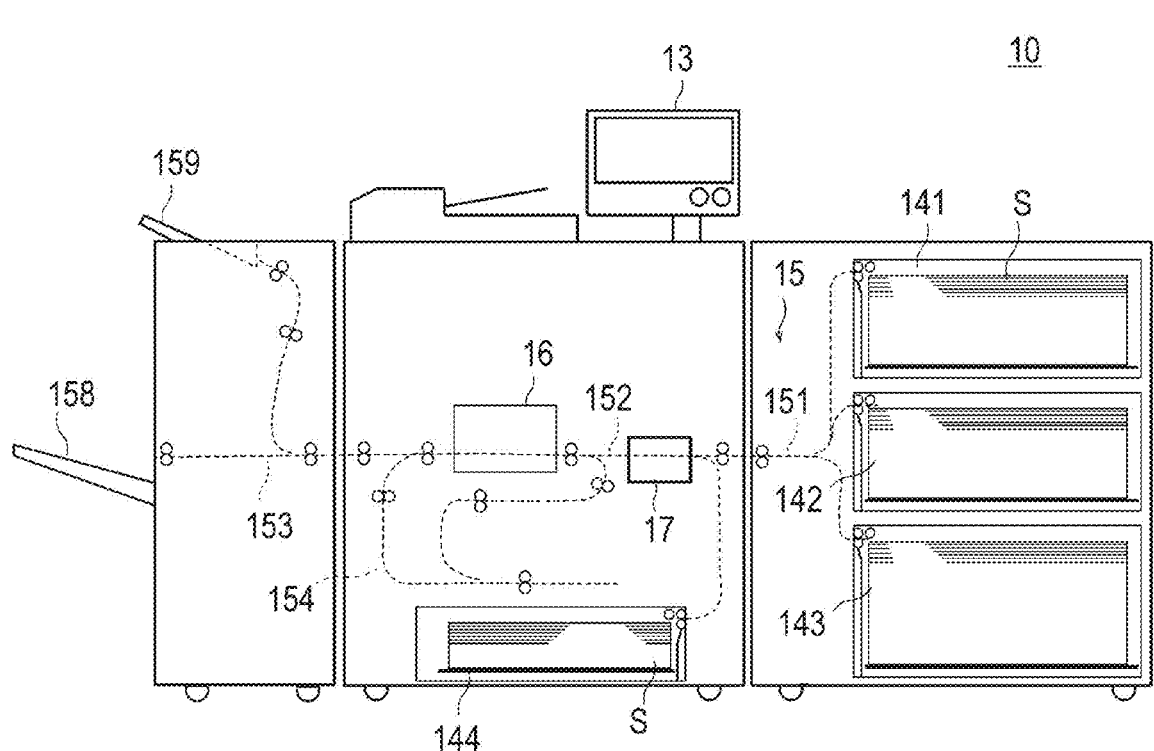
FIG. 2 is a schematic sectional diagram illustrating an overall configuration of the image forming apparatus.

Embodiments of the present invention will be described hereinafter with reference to the attached drawings. However, the scope of the present invention is not limited to the disclosed embodiments. In the description of the drawings, the same elements are denoted by the same reference signs, and redundant description thereof will be omitted. In addition, dimensional ratios in the drawings are exaggerated for convenience of description and may be different from actual ratios. In the present embodiment, a recording medium includes printing sheets (hereinafter, simply referred to as sheets) and various films. In particular, the sheets include a sheet produced using mechanical pulp and/or chemical pulp derived from a plant. Examples of the types of sheets include a coated glossy sheet, a matte sheet, an uncoated plain sheet, and a high-quality sheet.

FIG. 1 is a diagram illustrating a schematic configuration of an information processing system 1000 including an image forming apparatus 10 according to the present embodiment. The information processing system 1000 includes one or more image forming apparatuses 10 (10-1 to 10-$n$) and a management server 50. The information processing system 1000 may also include a terminal apparatus 30. The terminal apparatus 30 is a PC, a tablet terminal, a smartphone, or the like, and is used by an administrative user of a service staff management company or the like that maintains and manages the image forming apparatus 10. These apparatuses are communicatively connected to each other via a network. The management server 50 is an on-premise server located in a building where the image forming apparatus 10 is installed, or a cloud server using a commercial cloud service. The management server 50 functions as a database server and includes a database of sheet brand reference data and a sheet usage record database (hereinafter simply referred to as a usage record DB) (both described later).

The management server 50 collects usage record data of sheets and the like periodically sent from each image forming apparatus 10 (for example, upon completion of a job or daily), and accumulates the collected usage record data as sheet record data. Furthermore, in the "sheet brand reference data" (also referred to as a reference database or a media bank), characteristic data of a sheet brand used in the market is registered. The characteristic data of the sheet brand is used to identify the sheet brand using characteristic data of a sheet. In a case where a new sheet brand is used in the market, the administrative user measures sheet characteristic data and registers the measured sheet characteristic data in the sheet brand reference data. Furthermore, the administrative user of the terminal apparatus 30 or the like collects, through an external server 90 (e.g., a search engine, a paper manufacturer's website, or a paper distributor's website), usage records of sheets from a sheet sales company, a sheet manufacturing company, or a company organization that aggregates these kinds of information. Then, the collected information may be registered in the usage record DB of the management server 50 as sheet usage records in the market.

Here, first to third information will be described.
(First Information and Second Information)

The first information is brand information of the recording medium (sheet) and/or manufacturer information (sheet manufacturer) of the recording medium. The brand information includes the brand name of the recording medium. The brand information may include a sheet type and a basis weight in addition to the brand name. The second information is information regarding the usage amount or the usage rate of the recording medium associated with the first information. For example, the second information is the usage amount of the brand in the market. The usage amount mentioned here is, in a broad sense, the amount of the recording medium distributed in the market, and in a narrow sense, the amount (hereinafter, referred to as a usage amount in the image forming apparatus) of the recording medium used for image formation (printing) by the image forming apparatus. The usage amount can include the total weight and the number of used sheets, but in the following description, the usage amount will be described as the number of sheets used, unless otherwise specified. The usage rate in each piece of the first information is calculated by dividing the usage amount in the first information by the total usage amount of all brands.

In the present embodiment, the usage amount in the image forming apparatus as the second information is mainly described as the number of used sheets of the recording medium in a plurality of image forming apparatuses manufactured by the same manufacturer (or the number of used sheets obtained by totalizing the numbers of used sheets in the plurality of image forming apparatuses) and capable of determining a brand as described below (in particular, a second embodiment described below). Here, the same manufacturer refers to a manufacturer (hereinafter referred to as an "apparatus manufacturer") of the image forming apparatus. Although details will be described later, in the image forming apparatus capable of determining a brand, a physical property of the recording medium is detected by an internal or external physical property detector (also referred to as a medium sensor), and the brand is determined from a physical property value detected by using an information converter.
(Third Information)

The third information is transmitted from the image forming apparatus 10 to the management server 50 together with the first and second information. The management server 50) associates the received first to third information with each other and accumulates the first to third information in the usage record DB. The third information is information of a print setting, an installation environment, an installation area, and/or an installation office when an image is formed on a sheet in a case where the usage amount in the image forming apparatus is used. The print setting includes information of single-sided/double-sided setting, monochrome/color setting, character/photograph setting, and a sheet size. The installation environment includes the temperature, humidity, and atmospheric pressure of the surrounding environment of the image forming apparatus 10. Detection data obtained by a sensor included in the image forming apparatus 10 may be used as the installation environment. The installation area is a location where the image forming apparatus 10 is installed, and is, for example, country information such as Japan or the United States, or area information such as Europe. More specifically, the installation area may be information of a prefecture in Japan. The installation office is information of a business entity that owns or uses the image forming apparatus 10. Information on the installation area and the installation office is registered, for example, in a machine list managed by the apparatus manufacturer or a sales company of the image forming apparatus 10, in association with a machine identification number (S/N) for identifying the image forming apparatus 10). The machine list includes information indicating a model. The model is also referred to as a model number or a product name. The information of the installation environment and the installation area, which are not changed in the third information, can be omitted from being transmitted each time by adding the information of the machine S/N of the image forming apparatus 10) to the first and second information to be transmitted. The management server 50 side can identify the information of the installation environment and the installation area corresponding to the machine S/N by referring to the machine list.

Figure 3:
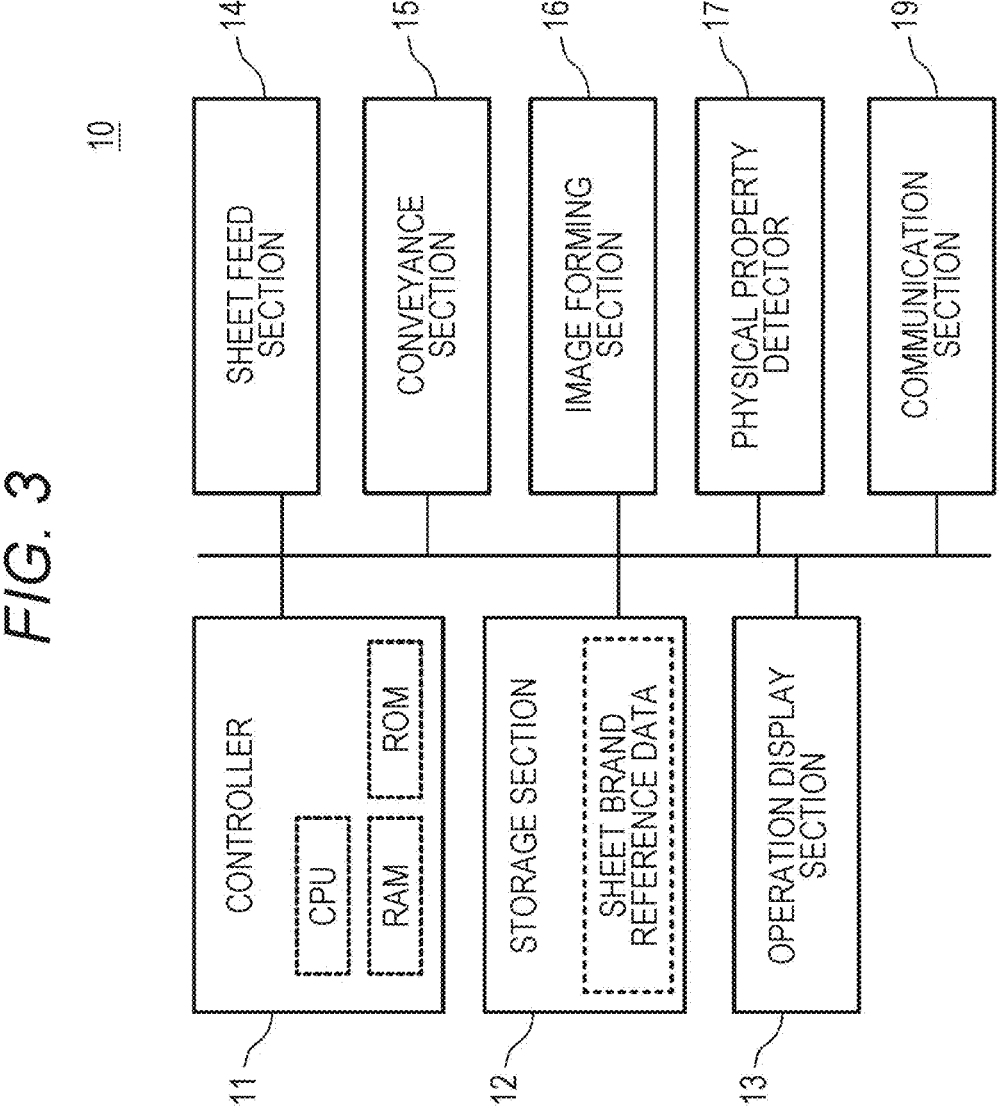
FIG. 3 is a block diagram of the image forming apparatus.

FIG. 2 is a schematic sectional diagram illustrating an overall configuration of the image forming apparatus 10. FIG. 3 is a block diagram illustrating a hardware configuration of the image forming apparatus 10. As illustrated in FIGS. 2 and 3, the image forming apparatus 10) includes a controller 11 (i.e., hardware processor), a storage section 12, an operation display section 13, a sheet feed section 14, a conveyance section 15, an image forming section 16, a physical property detector 17, and a communication section 19.

(Controller 11)

The controller 11 includes a CPU and memories such as a RAM and a ROM. The CPU is a control circuit constituted by a multi-core processor or the like that executes control of each of the above-described sections and various kinds of arithmetic processing according to a program, and each function of the image forming apparatus 10 is implemented by the CPU executing a program corresponding to each function of the image forming apparatus 10. Furthermore, the controller 11 functions as the information converter and determines a sheet brand based on a detected physical property value using the sheet brand reference data stored in the storage section 12.

The storage section 12 is a large-capacity auxiliary storage device that stores various programs including an operating system and various data. As the storage section 12, for example, a hard disk, a solid state drive, a flash memory, a ROM, or the like is used. The storage section 12 stores the sheet brand reference data. When the sheet brand reference data managed by the management server 50 is updated, a copy of the sheet brand reference data is sent and the content of the sheet brand reference data is updated.

The operation display section 13 functions as a display section, includes a touch panel, a numeric keypad, a start button, a stop button and the like, and is used for displaying various kinds of information and inputting various instructions. A user can set sheet information such as the size and type of a sheet stored in each sheet feed tray via the operation display section 13. Further, the user can instruct the execution of a print job through the operation of the operation display section 13. The user can visually recognize the first information of the recording medium and the second information of the recording medium associated with the first information displayed on the operation display section 13. The operation display section 13 is not limited to the touch panel type, and may include separate components such as a mouse, a keyboard, and a display panel, for example.

The sheet feed section 14 includes one or a plurality of sheet feed trays 141 to 144, feeds sheets S stored in the sheet feed tray 141 and the like one by one, and sends the sheets S to a conveyance path of the conveyance section 15.

The conveyance section 15 includes conveyance paths 151 to 154 and sheet ejection trays 158 and 159. The conveyance section 15 further includes sheet detection sensors (sheet presence/absence detection sensors) disposed in the conveyance paths 151 to 154, a plurality of conveyance rollers, and drive motors (none of which are illustrated) that drive the conveyance rollers. Above the conveyance path 152, the physical property detector 17 is arranged on the upstream side of a resist roller, and the image forming section 16 is arranged on the downstream side of the resist roller. In the sheet feed section 14 or each of the conveyance paths 151 to 154 of the conveyance section 15, a sheet detection sensor detects the presence or absence of a sheet S at a predetermined timing, thereby detecting whether a conveyance failure (jam) occurs.

The conveyance paths 151 to 154 guide the sheet S fed from the sheet feed section 14 to the sheet ejection tray 158 or 159 via the image forming section 16. The double-sided conveyance path 154 is used for double-sided image formation, and receives the sheet S having an image formed on the front surface (first surface) thereof, reverses the front and back of the sheet S, and guides the sheet S again to the image forming section 16 above the main conveyance path 152. The image forming section 16 forms an image on the back surface (second surface) of the sheet S.

(Image Forming Section 16)

The image forming section 16 forms a toner image (unfixed image) on the sheet S by, for example, an electrophotographic method. The image forming section 16 includes writing sections, photosensitive drums, developing sections which store a two-component developer containing toner and carrier, a primary transfer section, a secondary transfer section, a fixing section, and the like (none of which are illustrated). Each of the writing sections, each of the photosensitive drums, and each of the developing sections correspond to a respective one of basic colors of yellow (Y), magenta (M), cyan (C), and black (K). Toner images formed on the photosensitive drums by the developing sections of the respective colors are transferred onto an intermediate transfer belt, superimposed on the intermediate transfer belt, and transferred by the secondary transfer section onto a sheet S conveyed on the conveyance path 152. The fixing section fixes the toner image formed on the sheet S by the secondary transfer section on the upstream side onto the sheet S by performing a fixing process of heating and pressing the toner image. An image forming parameter (also referred to as a process condition or an image forming condition) is output settings such as output voltage settings for the developing sections and the transfer sections of the image forming section 16, a charging electrode or surface potential setting for the photosensitive drums, and a temperature setting for the fixing section. The image forming parameter is appropriately adjusted according to a physical property of the sheet S, a printing mode, and temperature and humidity conditions.

(Physical Property Detector 17)

Figure 4:
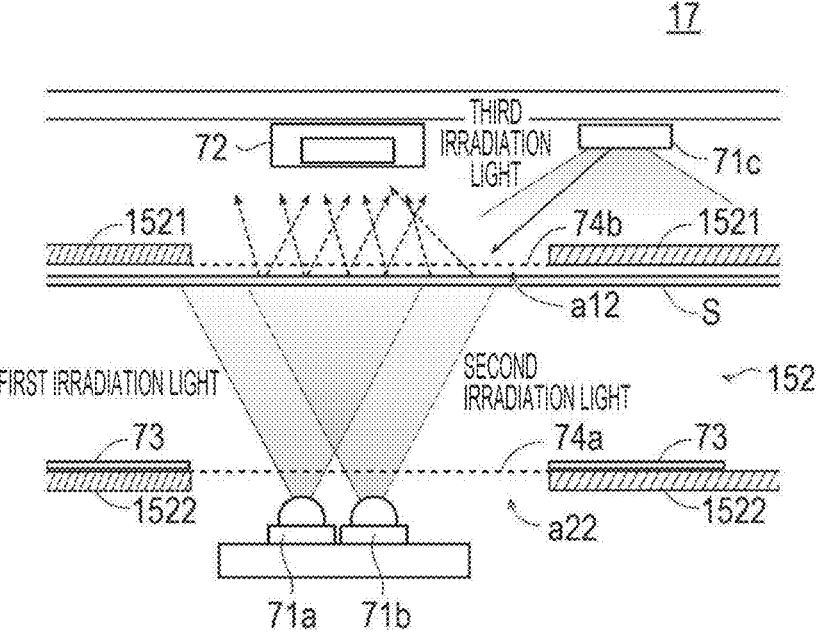
FIG. 4 is a schematic diagram illustrating a configuration of a physical property detector.

FIG. 4 is a schematic diagram illustrating a configuration of the physical property detector 17. The physical property detector 17 is a transmission type and reflection side optical sensor that detects a physical property value of the sheet S conveyed on the conveyance path 152, includes light emitters and a light receiver, and measures light amounts (transmittance and reflectance) of light transmitted through and reflected by the sheet S. The controller 11 may cause the physical property detector 17 to perform the measurement while conveying the sheet S. or may cause the physical property detector 17 to perform the measurement while temporarily stopping the sheet S at a detection position.

As illustrated in FIG. 4, the physical property detector 17 includes the plurality of light emitters 71 and the single light receiver 72. The light emitters 71 include a first light emitter 71*a*, a second light emitter 71*b*, and a third light emitter 71*c*. First, second and third irradiation light are respectively emitted from the first, second, and third light emitters to an irradiation region. The conveyance path 152 is formed between upper and lower guide plates 1521 and 1522. The upper guide plate 1521 of the conveyance path 152 is provided with an opening a12. The lower guide plate 1522 is also provided with an opening a22 at a position opposite to the opening a12. The openings a12 and a22 have the same shape, for example, a rectangular shape. In order to prevent a foreign substance such as sheet dust from the sheet S passing through the conveyance path 152 from adhering to the openings a12 and a22, transparent sheets 74*a* and 74*b* which are made of PET or the like and through which the irradiation light with wavelengths is transmitted are attached at the openings a12 and a22.

The first light emitter 71*a* emits the first irradiation light having a first wavelength. The first wavelength is, for example, a wavelength of near-infrared light longer than a wavelength of visible light. More particularly, the first wavelength is, for example, a wavelength between 750 nm and 900 nm. The second light emitter 71*b* emits the second irradiation light having a second wavelength. The second wavelength is, for example, a wavelength of blue light included in visible light. More particularly, the second wavelength is, for example, a wavelength between 400 nm and 470 nm. The first light emitter 71*a* and the second light emitter 71*b* are both disposed on the opposite side to the light receiver 72 with respect to the conveyance path 152, and the third light emitter 71*c* is provided on the same side as the light receiver 72 and in the vicinity of the light receiver 72. The third light emitter 71*c* emits the third irradiation light having a third wavelength toward the irradiation region (opening a12). The third wavelength is, for example, a wavelength of green light included in visible light. More specifically, the third wavelength is, for example, a wavelength between 495 nm and 570 nm. The third wavelength is different from the first wavelength (for example, a wavelength between 750 nm and 900 nm) and the second wavelength (for example, a wavelength between 400 nm and 470 nm).

The third irradiation light is emitted toward the conveyance path 152 in the upper and lower guide plates 1521 and 1522. A reflection portion 73 is provided inside the lower guide plate 1522 provided near the first light emitter 71*a* and the second light emitter 71*b*. The reflection portion 73 is coated with, for example, a green color having the same color as the third 20) irradiation light, and reflects the third irradiation light. The reflection portion 73 does not reflect the first irradiation light (near-infrared light) and the second irradiation light (blue light) which do not have the same color as the third irradiation light.

In the present embodiment, in measurement, the controller 11 controls the first light emitter 71*a* and the second light emitter 71*b* to cause the first light emitter 71*a* and the second light emitter 71*b* to emit the first irradiation light and the second irradiation light at different timings. The light receiver 72 receives the first irradiation light and the second irradiation light, detects the light amount of the first irradiation light and the light amount of the second irradiation light, and outputs the detected light amount of the first irradiation light and the detected light amount of the second irradiation light to the controller 11. Regarding the physical property detector 17, the sheet S conveyed to the position of the opening a12 is irradiated with the first irradiation light and the second irradiation light. The light receiver 72 receives the transmitted light (first transmitted light and second transmitted light) of the first irradiation light and the second irradiation light, detects the light amount of the first irradiation light and the light amount of the second irradiation light, and outputs the detected light amount of the first transmitted light and the detected light amount of the second transmitted light to the controller 11. That is, the light receiver 72 detects the first irradiation light and the second irradiation light when the sheet S is not present, and detects the first transmitted light and the second transmitted light when the sheet S is present at the opening a12. Hereinafter, values based on the transmittances of the first and second irradiation light depending on the presence or absence of the sheet S are referred to as an A value and a B value.

Regarding the third light emitter 71*c*, similarly, the light receiver 72 detects the first reflection light reflected by the reflection portion 73 when the sheet S is not present, and detects the second reflection light reflected by the front surface of the sheet S when the sheet S is at the opening a12. Hereinafter, the ratio of the first and second reflection light depending on the presence or absence of the sheet S is referred to as a C value. In the example illustrated in FIG. 4, the reflection portion 73 is provided, but may be omitted.

The physical property detector 17 may include a sheet thickness detector and a surface property detector as other detection functions. The position of a shaft of a movable driven roller is displaced in accordance with a thickness of the sheet S pinched and conveyed by the pair of conveyance rollers in the sheet thickness detector. The sheet thickness detector measures the thickness of the sheet S by measuring a height position where the displaced shaft is located. The surface property detector irradiates the surface of the sheet with light obliquely (for example, at an incident angle of 75 degree). Then, the surface property detector detects the light amounts of specular reflected light and diffusely reflected light by a plurality of light receivers, and detects the surface property of the sheet S based on absolute values and ratios of the intensities of the light received by the light receivers. The basis weight and sheet type of the sheet can also be determined from information of the thickness and the surface property obtained from these detectors.

The controller 11 calculates the first transmittance by dividing the light amount of the first transmitted light by the light amount of the first irradiation light. The controller 11 calculates the second transmittance by dividing the light amount of the second transmitted light by the light amount of the second irradiation light in the same manner. Then, the controller 11 determines the type (sheet type) of the sheet S from the first and second transmittances and a determination criterion stored in the storage unit 12. The controller 11 detects the basis weight of the sheet S based on the intensity of light that passed through the sheet S and was received by the light receiver. Furthermore, the information converter of the controller 11 determines a sheet brand from the A value, the B value, the C value, and the determined basis weight and sheet type by using the sheet brand reference data (FIG. 7B described later).

(Communication Section 19)

The communication section 19 is also an interface for network connection to an external device such as a PC.

(Usage Record Accumulation Process)

Figure 5:
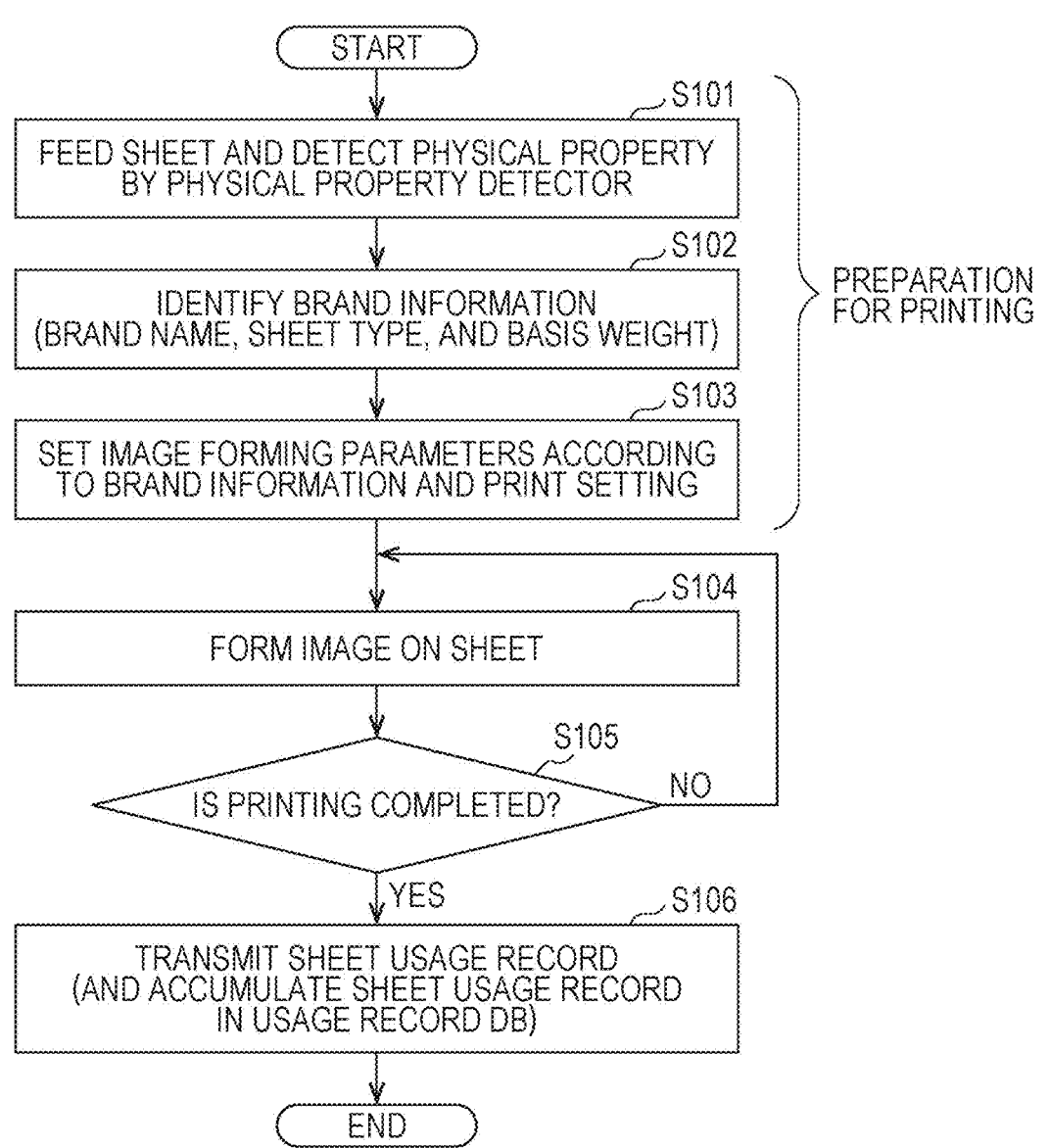
FIG. 5 is a flowchart illustrating an accumulation process to a sheet usage record database.

Next, with reference to FIGS. 5 to 8B, a description will be provided on a usage record accumulation process according to use of a sheet in the image forming apparatus 10. FIG. 5 is a flowchart illustrating the accumulation process to the usage record DB.

Figure 6:
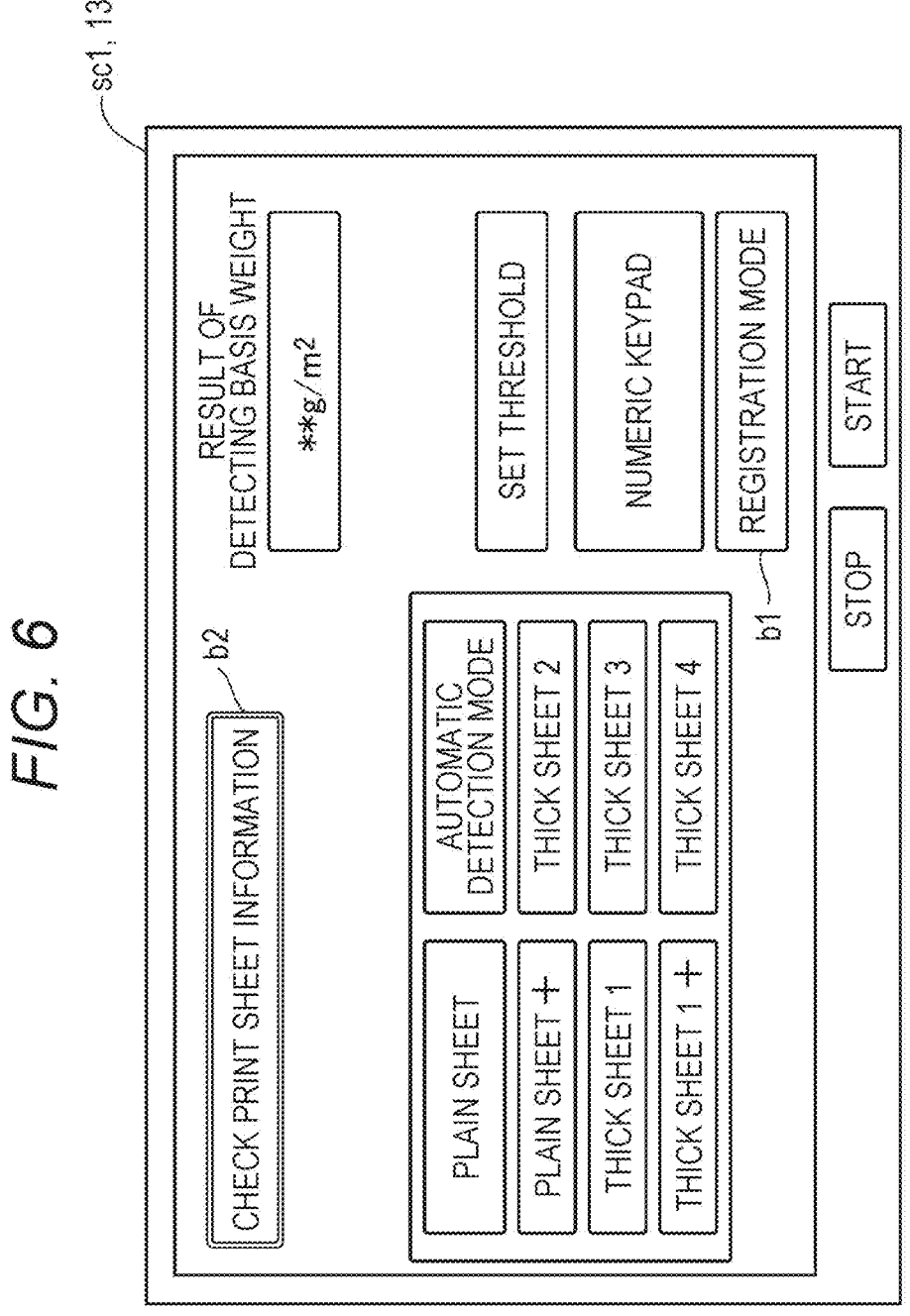
FIG. 6 is a diagram illustrating an example of a sheet type setting screen displayed on an operation display section.

Steps S101 to S103 are processing in a stage of preparation for printing, and characteristics of a sheet to be used for a print job, such as a sheet brand and physical properties of the sheet, are registered. FIG. 6 illustrates an example of a sheet type setting screen sc1 displayed on the operation display section 13. The setting screen sc1 is a screen on which the type of sheet determined using a physical property value detected by the physical property detector 17 is displayed as a button in a selectable form. The setting screen sc1 is displayed on a display part of the operation display section 13 when a mode for registering the type of sheet is instructed by a user such as a service person (maintenance person) or the administrative user of the image forming apparatus 10. The registration of the sheet type in the registration mode is performed by the user operating the operation display section 13. For example, the user sets a plurality of sheets of the same type to be registered (used for the print job) in any one of the sheet feed trays (for example, the sheet feed tray 141), and operates a start registration mode button b1 or the like displayed on the operation display section 13.

(Step S101)

This processing is performed in a case where the start of the registration mode relating to a sheet setting by the user in the stage of preparation for printing is instructed (an operation of the start registration mode button b1 or the like). In this case, in the image forming apparatus 10, a sheet S is fed from the sheet feed tray 141, and the physical property values of the sheet S are detected by the physical property detector 17. Thereafter, the sheet S is ejected to the second sheet ejection tray 159 such that the sheet S can be reused. The controller 11 links the physical property values (the A value, the B value, and the C value) obtained at that time with the sheet type and the basis weight determined from the physical property values, and temporarily stores the physical property values linked with the sheet type and the basis weight in the storage unit 12. FIG. 7A is a diagram illustrating sheet characteristic information (hereinafter, referred to simply as characteristic data) on a target sheet S obtained by the detection by the physical property detector 17 in the processing in step S101. At this point, a sheet brand has not been identified.

(Step S102)

The controller 11 functioning as the information converter identifies the sheet brand based on the characteristic data in FIG. 7A. For example, the controller 11 predicts the brand by comparing the sheet brand reference data (hereinafter referred to simply as reference data) stored in the storage section 12 with the characteristic data obtained in step S102. FIG. 7B illustrates an example of the sheet brand reference data (hereinafter, also simply referred to as reference data). This reference data is managed by the management server 50 as described above, and is updated as appropriate. The reference data is transmitted from the management server 50 to the image forming apparatus 10 at a predetermined timing such as the time of update. Several hundred brands are registered in the reference data. As an example, in the following description, it is assumed that 300 brands are registered in the reference data. The controller 11 normalizes the physical property values (A to C values) of the characteristic data of the target sheet based on the maximum/ minimum of physical property values (A to C values) of the reference data. Then, the controller 11 calculates a difference between the target sheet and a reference sheet for each physical property by trial, and calculates suitability for each record of the reference data from the magnitude of the difference. Then, among the multiple records, a sheet brand with the highest suitability is used as a result of the determination. FIG. 7C illustrates an example of results of suitability for each sheet brand. Further, rankings in descending order of the suitability among the 300 types (300 records) are displayed as brand prediction rankings. The controller 11 displays brands Nos. 1 to 5, which are some of the 300 brands in FIG. 7C. In the example illustrated in FIG. 7C, the controller 11 displays that the record of the brand No. 2 has the highest suitability (ranked first) (within a broken line frame in FIG. 7C). The controller 11 identifies (estimates) that the sheet S that is a target is a sheet of the sheet brand B indicated in a record No 2.

As another example of the information converter, the controller 11 obtains a plurality of sheet brands and likelihoods (scores) as outputs by inputting physical property values to a machine model using a trained machine model. Also in this case, a sheet brand having the highest likelihood may be used as a result of determination. This trained model is generated by supervised learning using, as a correct label, a brand name set by a user for sheet characteristic data. These types of sheet brand determination processing may be performed not by the image forming apparatus 10 but by the management server 50. In this case, the management server 50 that has acquired specific data from the image forming apparatus 10 identifies the sheet brand using the reference data or the machine model by the information converter of the management server 50. Furthermore, in this case, the determination of the sheet type and the basis weight may also be performed on the management server 50 side.

(Step S103)

The controller 11 sets image forming parameters in the image forming section 16, based on the print setting for the print job, and the sheet type and basis weight of the sheet S obtained by the detection in the processing up to step S102, or characteristic data including the sheet type and the basis weight.

(Steps S104 and S105)

In this case, the controller 11 executes the print job using the sheet S with the set image forming parameters. When the printing up to the number of sheets according to the print setting for the print job is completed (S105: YES), the process proceeds to step S106. In a case where a jam in conveyance or feeding of a sheet S is detected during the printing, the number of times that the jam occurred is counted as the number of jams.

(Step S106)

The image forming apparatus 10 transmits data of a sheet usage record to the management server 50 at a timing when the print job is completed or at a predetermined timing (for example, every day) by the processing up to step S105. The management server 50 accumulates the received sheet usage record in the usage record DB. In this case, the sheet usage record that the image forming apparatus 10 transmits to the management server 50 includes first information (sheet brand (brand S/N)), second information (the number of sheets used), and third information (the print setting and the number of jams). FIGS. 8A and 8B illustrate examples of the usage record DB. As described above, the usage record DB stores data of sheet usage records sent from the plurality of image forming apparatuses 10 connected to the management server 50 via the network. The data of the sheet usage records includes the machine S/Ns for identifying the image forming apparatuses 10, a date (date and time) when printing is performed or when the data is transmitted, and first to third information. For example, the first information is information regarding the brand or manufacturer of the recording medium, and this information is associated with a main key (S/N of the brand) (see FIG. 7B). The second information is numerical data regarding a usage amount or a usage rate associated with the first information. The third information is incidental data, which is also referred to as metadata, and is used for a search (narrowing down). As described above, the third information includes information of the print setting, the installation environment, the installation area, and the installation office of each of the image forming apparatuses. The print setting of each of the image forming apparatuses is a print setting when a print job is executed using a sheet S (see step S103 in FIG. 5). Information of the installation environment, the installation area, and the installation office in the third information can be acquired from a table (machine list) (not illustrated) using the machine S/N as a main key.

FIG. 8B is an example of a usage record for each sheet brand extracted from the usage record DB. The number of used sheets (and the usage rate) is obtained by totalizing the number of used sheets of each machine for each sheet brand.

(Display Process)

Figure 10:
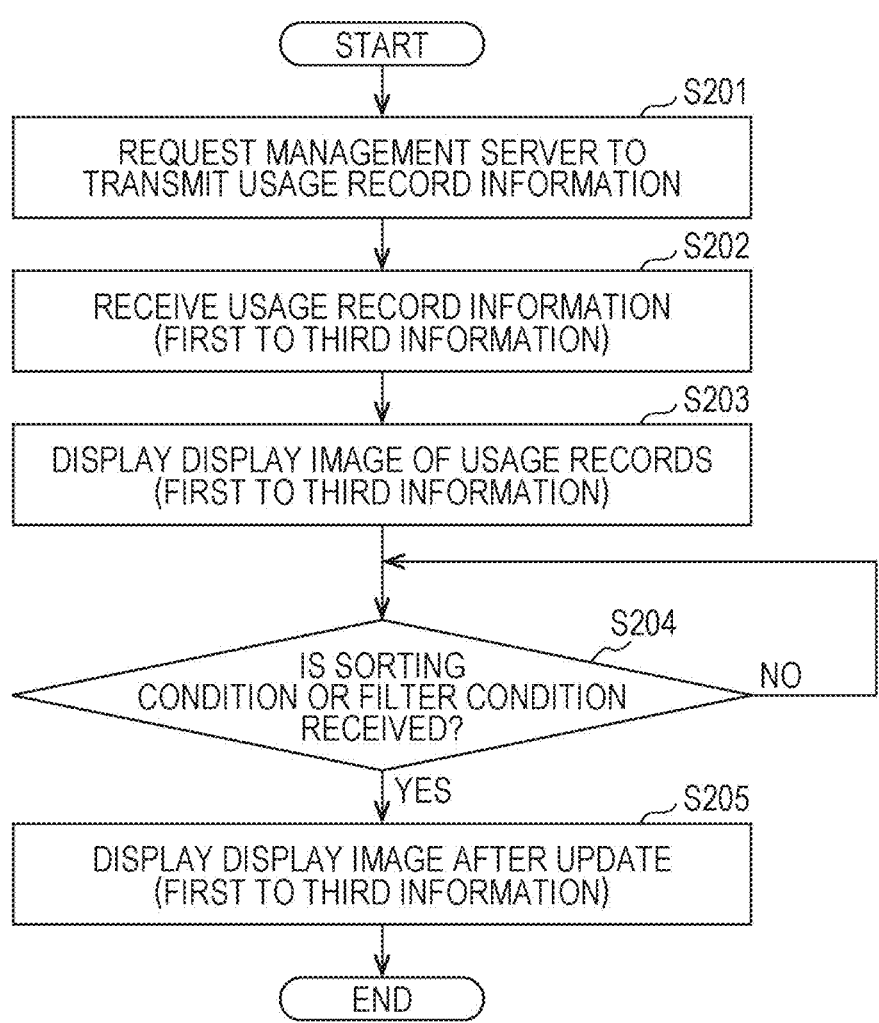
FIG. 10 is a flowchart illustrating a display process in the image forming apparatus according to the first embodiment.

Next, with reference to FIGS. 9 to 11, a display process of displaying usage records using the usage record DB storing the usage records accumulated by the processing described above will be described. FIG. 9 is a diagram illustrating the flow of data in the information processing system 1000, and FIG. 10 is a flowchart illustrating the display process in the image forming apparatus 10 according to the first embodiment.

(Step S201)

The image forming apparatus 10 notifies the management server 50 of a request to transmit usage record information. For example, in a case where the image forming apparatus 10 receives an operation on a check print sheet information button b2 on the screen sc1 illustrated in FIG. 6 by the user, the image forming apparatus 10 transmits a request to transmit the usage record information to the management server 50.

The management server 50 transmits the sheet usage record information including the first and second information or including the first to third information. For example, in response to the request, the management server 50 transmits usage record information of the number of used sheets and the usage rate, which are aggregated for each brand as illustrated in FIG. 8B.

(Step S202 and S203)

The image forming apparatus 10 receives the usage record information. Further, the controller 11 of the image forming apparatus 10 generates a display image based on the usage record information and causes the operation display section 13 to display the display image. For example, the controller 11 displays, on the operation display section 13, a list of the usage amounts or the usage rates of the 300 brands in order of brand S/Ns or displays the usage amounts or the usage rates in descending order of numerical values of the usage amounts (usage rates). FIG. 11 illustrates an example of the display image displayed on the operation display section 13. In FIG. 11, the controller 11 arranges (sorts) and displays, on the operation display section 13, records for the brands in descending order of numerical values of the usage amounts. Furthermore, in FIG. 11, market usage amount rankings are also displayed for easy understanding. For example, FIG. 11 illustrates that S paper that is ranked first and is most frequently used in the market has been used with 800,000 sheets out of a total of 120 million sheets, and the usage rate of S paper is 0.6667%. The example of FIG. 11 is a conceptual illustration, and on the display screen in the embodiment, some records are displayed in accordance with the size of the display screen, and the user can view all the records by scrolling them. In the example of FIG. 11, the controller 11 displays the sheet brands as the first information on the operation display section 13, but instead of this, the controller 11 may display usage amounts or usage rates of sheets in the market aggregated for each piece of manufacturer information (sheet manufacturers). In addition, the controller 11 may display the third information such as the print setting, the installation environment, the installation area, and the installation office on the operation display section 13 together with the information of the first and second information. For example, the controller 11 may display the third information together with the number of jams (the number of jams that occurred), the jam rate (the jam occurrence rate), or the print setting on the operation display section 13.

(Step S204 and S205)

Upon receiving a sorting condition or a filter condition from the user, the controller 11 updates the displayed data. For example, the controller 11 receives, as a filter condition, a print setting (monochrome/character or the like) as the third information, an installation area (Aichi. Japan. or the like), and a specific installation provider. In this case, the controller 11 calculates a usage amount for a record that matches the filter condition, and displays an updated display image (for example. FIGS. 15A to 15C described later).

The third information is added to the usage record information received in step S202, and the calculation of the usage amount under the filter condition is performed by the image forming apparatus 10 using this usage record information. However, depending on the content of the third information, it may be difficult to include the third information in the usage record information received in step S202 (for example, the amount of data becomes enormous). In such a case, the image forming apparatus 10 may transmit the filter condition to the management server 50, and the management server 50 may calculate the usage amount and transmit usage record information obtained through the filter processing to the image forming apparatus 10.

As described above, the image forming apparatus 10 according to the first embodiment causes the display section to display the first information regarding the brand of the recording medium or the manufacturer of the recording medium and the second information regarding the usage amount or the usage rate of the recording medium associated with the first information. Thus, the user can easily know the brand of the recording medium appropriate for image formation. In particular, on a recording medium that is frequently used or is used at a high usage rate or a recording medium manufactured by a manufacturer of the recording medium, a high-quality image is likely to be formed without causing a problem. Therefore, it is very useful for the user to present (display) the usage amount or the usage rate for each brand or manufacturer.

Second Embodiment

Next, a display process in an image forming apparatus 10 according to the second embodiment will be described with reference to FIGS. 12 to 15C. In the second embodiment, usage records of a plurality of sheet brands narrowed down based on physical properties of sheets S are displayed as sheet brands related to the sheets S to be used in a print job.

Figure 12:
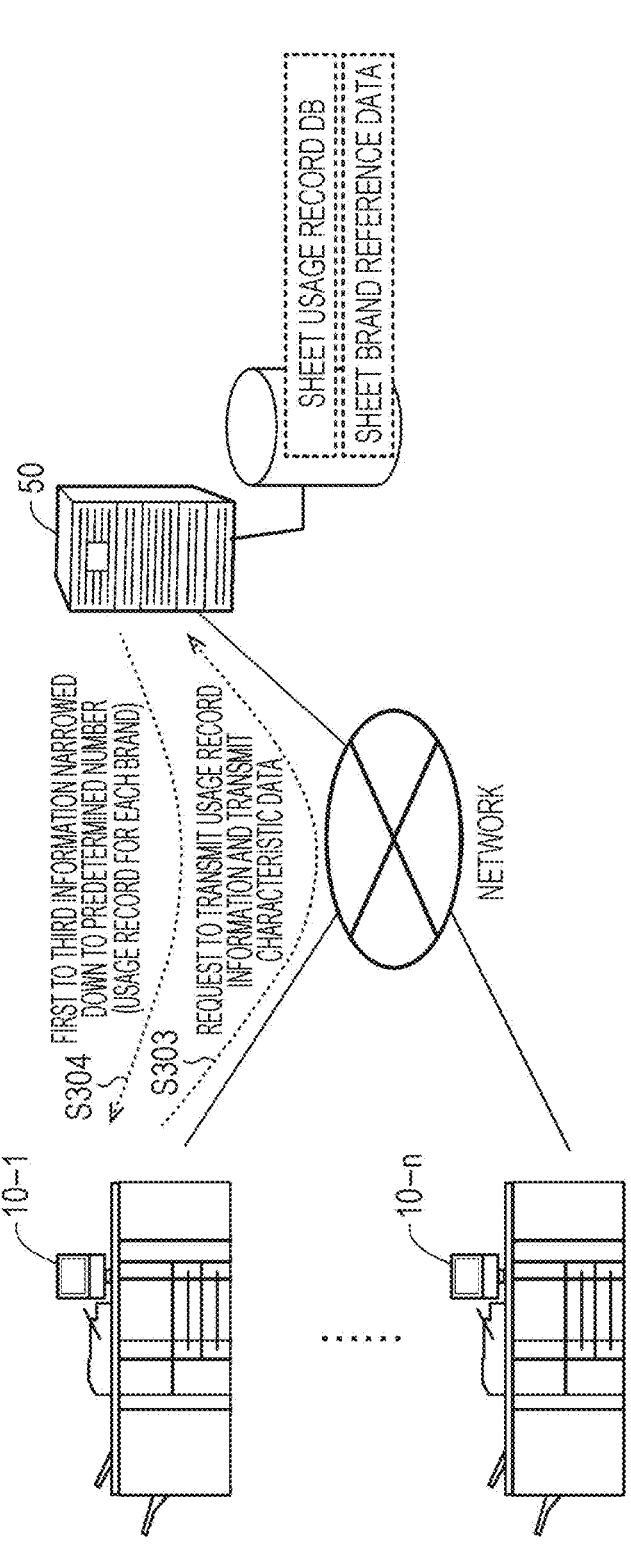
FIG. 12 is a diagram illustrating the flow of data in an information processing system according to a second embodiment.

FIG. 12 is a diagram illustrating the flow of data in an information processing system 1000 according to the second embodiment, and FIG. 13 is a flowchart illustrating the display process in the image forming apparatus 10 according to the second embodiment.

(Steps S301 and S302)

The image forming apparatus 10 measures a sheet S using a physical property detector 17 and identifies brand information from an obtained physical property value. This processing in steps S301 and S302 is the same as the processing in steps S101 and S102, and a description thereof will not be repeated. Processing in steps S301 to S306 relates to preparation for printing.

(Step S303)

In response to the detection of a physical property of the sheet S by the physical property detector 17 in step S301 in a stage of preparation for printing, the image forming apparatus 10 notifies a management server 50 of a request to transmit usage record information. In this case, the image forming apparatus 10 also transmits characteristic data detected by the physical property detector 17 (see FIG. 7A).

The management server 50 that has acquired the characteristic data from the image forming apparatus 10 causes an information converter of the management server 50 to calculate suitability for each record from the characteristic data using sheet brand reference data. FIG. 14A is a diagram illustrating a table of a usage record DB in which brands are sorted in descending order of brand prediction rankings (in descending order of suitability). The management server 50 selects records of which the suitability is equal to or greater than a predetermined value, or records of which the rankings are within a predetermined ranking, which is a predetermined number. For example, the management server 50) narrows down brands to sheet brands ranked in the top five in the brand prediction rankings and transmits, to the image forming apparatus 10 that has made the request, usage record information including five records obtained by the narrowing-down and indicating the sheet brands ranked in the top five. A default value is used as the predetermined number, but a predetermined number may be appropriately set for each image forming apparatus 10 by a user's operation via an operation display section 13.

(Steps S304 and S305)

The image forming apparatus 10 receives the usage record information generated by the processing on the management server 50 side, narrowed down to the predetermined number based on the sheet characteristic data, and including first to third information. Further, a controller 11 of the image forming apparatus 10 generates a display image based on the usage record information and causes the operation display section 13 to display the display image.

FIG. 14B is an example of the display image displayed on the operation display section 13. The generation and display of the display image may be performed each time the processing in step S301 is performed, or may be performed in response to a user's request, for example, in response to an operation of the check print sheet information button b2 on the setting screen sc1 illustrated in FIG. 6. In the example illustrated in FIG. 14B, a usage amount and a usage rate are displayed for each of sheet brands (for each of brands S/N) ranked in the top five in the brand prediction rankings based on the suitability. In addition, manufacturer information is displayed as the first information.

In addition, at the time of this display, the controller 11 may display a display image in which records are rearranged in order of the numbers of used sheets from the beginning or in response to a rearrangement request by a user. FIG. 14C is an example of a display image in which records are arranged in descending order of usage amounts/usage rates in the same data as that illustrated in FIG. 14B. In FIGS. 14B and 14C, the controller 11 may display a record of a sheet brand (for example, B sheet) to be (estimated to be) used in the print job on the operation display section 13 in a mode such as color coding, hatching, or thick characters such that the record can be distinguished from other sheet brands.

(Step S306)

By referring to the display image illustrated in FIG. 14C, the user replaces the sheet S loaded in a sheet feed tray when the user thinks that it is better to change the sheet S to be used in the print job related to the preparation for printing. After that, the processing in the step S301 and the subsequent steps are repeated. On the other hand, when it is not necessary to change or review the sheet S (NO), a start printing button or the like is operated on the operation display section 13 or the like.

(Step S307)

Processing in step S307 is the same as the processing in steps S103 to S106 illustrated in FIG. 5. The image forming apparatus 10 executes the print job using the sheet S with set image forming parameters. In addition, the usage record DB is updated according to the usage records.

As described above, in the second embodiment, the image forming apparatus displays, on the display section, the first information regarding a plurality of brands narrowed down using the information converter from the characteristic data obtained by the detection by the physical property detector and the second information regarding a usage amount or a usage rate of a recording medium in the first information. As a result, the same effect as that obtained in the first embodiment can be obtained, and the user can check a usage amount or the like in the usage record of the recording medium to be used in a subsequent print job in comparison with a similar recording medium having similar sheet characteristics to those of the recording medium to be used. Accordingly, it is possible to consider a change to a sheet that is frequently used, or to recognize a sheet to be used, which is a sheet that is rarely used and may be a poor-quality sheet, before the execution of the print job. For example, when such a sheet is used and a trouble such as a jam or an image with a low quality occurs during the execution of the print job, the user can easily recognize the cause of the poor-quality sheet without performing unnecessary trial and error.

Modifications

Also in the second embodiment, the image forming apparatus may receive the filter condition and display a display image based on the usage record information after the filter processing. FIGS. 15A to 15C illustrate examples of a display image indicating usage amounts based on the usage record information displayed on the operation display section 13 and matching the filter condition. FIG. 15A illustrates information obtained by filtering using the installation area included in the third information as Aichi Prefecture (Japan). FIG. 15B illustrates information obtained by filtering using the installation office included in the third information as "XYZ Corporation", and FIG. 15C illustrates information obtained by filtering using the print setting included in the third information as a monochrome and character mode. The usage amount of each of five brands illustrated in FIGS. 15A to 15C is the total of usage amounts under the filter condition (within Aichi Prefecture in FIG.

15A). In FIGS. 15A to 15C, the controller 11 causes the operation display section 13 to further display the third information (jam rate, installation area, installation business office, and print setting).

By performing filtering and displaying in this way, it is possible to present the user with more effective information for considering a sheet appropriate for image formation in accordance with the actual use state of the image forming apparatus 10.

The setting of these filtering conditions or the narrowing-down may be performed on the image forming apparatus 10 side. Alternatively, a user may be allowed to set a desired filter condition by selecting the type of filtering (print setting 1 or 2, an installation area, an installation office, or the like).

For example, the filtering conditions illustrated in FIGS. 15A and 15B are information that can be identified based on the machine S/N of the image forming apparatus 10 (its own apparatus) that has made the request to the management server 50 in step S303 and a machine list held on the management server 50 side. The print setting illustrated in FIG. 15C can also be identified from the information of the print setting for the print job regarding the preparation for printing. The controller 11 may present, to the user, the usage record information filtered under the filter condition set based on the information identified in this manner. Alternatively, the controller 11 may automatically set the filtering condition in a case where the type of filtering is designated by the user. For example, in the latter case, when the "installation area" is selected by the user. Aichi Prefecture is automatically set as the filter condition on the controller 11 side.

As described above, in the modification, the image forming apparatus can recognize more effective information for considering a sheet appropriate for image formation in accordance with conditions for actual use.

Regarding the configuration of the image forming apparatus described above, the main configuration has been described in describing the features of the above-described embodiments. The present invention is not limited to the above-described configuration and can be variously modified within the scope of the claims. In addition, a configuration included in a general image forming apparatus is not excluded. For example, although the electrophotographic image forming apparatus has been described in each of the above-described embodiments, the present invention is not limited thereto, and an image forming apparatus of another printing system, for example, an inkjet system may be used. For example, in the second embodiment, the timing of displaying a usage record may be any timing. For example, the display may be performed in response to a user's request (a display request and an input of a filter condition) through an operation panel. Alternatively, the processing in step S306 illustrated in FIG. 13 may be omitted. Furthermore, although the example in which the usage amount and the usage rate of each of the sheet brands (each brand S/N) ranked in the top five in the brand prediction rankings based on the suitability are displayed has been illustrated in the examples of FIGS. 14A to 15C, the number of records to be displayed may be changed to any number according to a user's request. When a usage record is displayed (steps S203, S205, and S305), an outputting button may be displayed on the display screen, and data of the displayed usage record may be outputted by printing or the like when the outputting button is operated by the user.

The embodiments may be applied in combination with each other. For example, the first and second embodiments and the modifications may be applied in combination with each other. In addition, although it has been described that the usage amount of the image forming apparatus as the second information is obtained by summing up the numbers of sheets used by the plurality of image forming apparatuses manufactured by the same apparatus manufacturer, the usage amount may be obtained by summing up the numbers of sheets used by image forming apparatuses of the same model.

In addition, the sections and methods for performing the various processes in the image forming apparatus 10 according to the above-described embodiments can be implemented by any of a dedicated hardware circuit and a programmed computer. For example, the program may be provided by a computer-readable recording medium such as a USB memory or a digital versatile disc (DVD)-ROM, or may be provided online via a network such as the Internet. In this case, the program recorded in the computer-readable recording medium is normally transferred to and stored in a storage unit such as a hard disk. In addition, the program may be provided as independent application software or may be incorporated into software of the apparatus as one function of the apparatus.

Although embodiments of the present invention have been described and illustrated in detail, the disclosed embodiments are made for purpose of illustration and example only and not limitation. The scope of the present invention should be interpreted by terms of the appended claims.

What is claimed is:

1. An image forming apparatus that forms an image on a recording medium, the image forming apparatus comprising:
   a display section; and
   a hardware processor that controls at least the display section, wherein
   the hardware processor causes the display section to:
   display first information regarding a brand of the recording medium or a manufacturer of the recording medium;
   simultaneously display second information regarding a usage amount or a usage rate of the recording medium associated with the first information such that the usage amount or usage rate of the recording medium of the displayed brand or manufacturer can be determined, and
   wherein the hardware processor causes the display section to display, in the information displayed on the display section, the second information associated with the first information of the recording medium and third information regarding a jam rate which is an occurrence rate of a conveyance failure and which is included in a usage record of the recording medium indicated by the first information of the recording medium.

2. The image forming apparatus according to claim 1, wherein the first and second information displayed by the display section is information acquired from a database in which usage record information of the recording medium in one or a plurality of image forming apparatuses is accumulated.

3. The image forming apparatus according to claim 2, wherein
   the database stores third information regarding at least one of a print setting, an installation environment, an installation area, and an installation office of the image forming apparatus that has formed an image on the recording medium indicated by the first information in association with the second information regarding the usage amount or the usage rate of the recording medium indicated by the first information of the recording medium, and the hardware processor causes the display section to display, in the information displayed on the display section, the second information regarding the usage amount or the usage rate of the recording medium indicated by the first information of the recording medium, the usage amount or the usage rate being calculated under a condition of the third information.

4. The image forming apparatus according to claim 2, further comprising a physical property detector that detects a physical property of the recording medium to be used, wherein the first information regarding the brand determined by using information converter from characteristic data obtained by the detection by the physical property detector, and a usage record of the recording medium are accumulated in the database in association with each other.

5. The image forming apparatus according to claim 1, wherein the second information is information in which usage record information of the recording medium in a plurality of image forming apparatuses of the same model or a plurality of image forming apparatuses of the same apparatus manufacturer is accumulated in association with the first information.

6. The image forming apparatus according to claim 1, wherein the first information that the hardware processor causes the display section to display includes information of a basis weight or a sheet type.

7. The image forming apparatus according to claim 1, wherein the information that the hardware processor causes the display section to display includes the second information regarding the usage amount or the usage rate of the recording medium indicated by the first information of the recording medium, and third information regarding at least one of a print setting, an installation environment, an installation area, and an installation office of the image forming apparatus that has formed an image on the recording medium indicated by the first information.

8. The image forming apparatus according to claim 1, further comprising a physical property detector for detecting a physical property of the recording medium to be used, and the brand of the recording medium is determined from the detected physical property.

9. An image forming apparatus that forms an image on a recording medium, the image forming apparatus comprising:

a display section; and a hardware processor that controls at least the display section, wherein the hardware processor causes the display section to:

display first information regarding a brand of the recording medium or a manufacturer of the recording medium;

simultaneously display second information regarding a usage amount or a usage rate of the recording medium associated with the first information such that the usage amount or usage rate of the recording medium of the displayed brand or manufacturer can be determined; and wherein the hardware processor causes the display section to display records each including a plurality of pieces of the first information and the second information associated with each piece of the first information in descending order of numerical values of the second information.

10. An image forming apparatus that forms an image on a recording medium, the image forming apparatus comprising:

a physical property detector that detects a physical property of a recording medium to be used, wherein the hardware processor causes the display section to display the first information regarding a plurality of brands narrowed down by using information converter from characteristic data obtained by the detection by the physical property detector and the second information regarding a usage amount or a usage rate of a recording medium in each piece of the first information;

a display section; and a hardware processor that controls at least the display section, wherein the hardware processor causes the display section to:

display first information regarding a brand of the recording medium or a manufacturer of the recording medium;

simultaneously display second information regarding a usage amount or a usage rate of the recording medium associated with the first information such that the usage amount or usage rate of the recording medium of the displayed brand or manufacturer can be determined, and wherein the hardware processor causes the display section to display, in the information displayed on the display section, the second information associated with the first information of the recording medium and third information regarding a jam rate which is an occurrence rate of a conveyance failure and which is included in a usage record of the recording medium indicated by the first information of the recording medium.

* * * * *